United States Patent
Kazmaier et al.

(10) Patent No.: US 7,857,900 B2
(45) Date of Patent: Dec. 28, 2010

(54) SOLID PHASE CHANGE FLUORESCENT INK AND INK SETS

(75) Inventors: Peter M. Kazmaier, Mississauga (CA); Gabriel Iftime, Mississauga (CA); Christopher A. Wagner, Etobicoke (CA); Shen-ge Wang, Fairport, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 123 days.

(21) Appl. No.: 12/234,056

(22) Filed: Sep. 19, 2008

(65) Prior Publication Data

US 2010/0071590 A1 Mar. 25, 2010

(51) Int. Cl.
*C09D 11/02* (2006.01)
*C09D 11/12* (2006.01)
*G01D 11/00* (2006.01)

(52) U.S. Cl. ............... 106/31.61; 106/31.64; 106/31.62

(58) Field of Classification Search ................. None
See application file for complete search history.

(56) References Cited

U.S. PATENT DOCUMENTS

| | | | |
|---|---|---|---|
| 5,006,170 A | 4/1991 | Schwarz et al. | |
| 5,122,187 A | 6/1992 | Schwarz et al. | |
| 5,128,525 A | 7/1992 | Stearns et al. | |
| 5,168,147 A | 12/1992 | Bloomberg | |
| 5,209,998 A | 5/1993 | Kavassalis et al. | |
| 5,507,864 A * | 4/1996 | Jaeger et al. | 106/31.32 |
| 5,622,821 A | 4/1997 | Selvin et al. | |
| 5,782,966 A | 7/1998 | Bui et al. | |
| 5,939,468 A | 8/1999 | Siddiqui | |
| 6,174,937 B1 | 1/2001 | Banning et al. | |
| 6,309,453 B1 | 10/2001 | Banning et al. | |
| 6,402,986 B1 | 6/2002 | Jones, II et al. | |
| 6,547,380 B2 | 4/2003 | Smith et al. | |
| 6,858,070 B1 | 2/2005 | Wong et al. | |
| 6,860,930 B2 | 3/2005 | Wu et al. | |
| 6,906,118 B2 | 6/2005 | Goodbrand et al. | |
| 7,108,742 B2 | 9/2006 | Hall-Goulle et al. | |
| 7,147,801 B2 | 12/2006 | Kozee et al. | |
| 7,328,851 B1 | 2/2008 | Iftime et al. | |
| 7,381,254 B2 | 6/2008 | Wu et al. | |
| 7,674,326 B2 * | 3/2010 | Iftime et al. | 106/31.29 |
| 2004/0241424 A1 | 12/2004 | Barbera-Guillem | |
| 2006/0016369 A1 | 1/2006 | Wu et al. | |
| 2007/0262579 A1 | 11/2007 | Bala et al. | |
| 2008/0087190 A1 | 4/2008 | Iftime et al. | |
| 2008/0090928 A1 * | 4/2008 | Iftime et al. | 522/75 |
| 2008/0110995 A1 | 5/2008 | Iftime et al. | |

FOREIGN PATENT DOCUMENTS

| | | | |
|---|---|---|---|
| EP | 0202902 A1 * | 11/1986 | |
| EP | 1 916 281 A1 | 4/2008 | |
| JP | A 07-304189 | 11/1995 | |

OTHER PUBLICATIONS

European Search Report mailed Jan. 19, 2010.
Wosnick et al., U.S. Appl. No. 11/837,585, filed Aug. 13, 2007.
Iftime et al., U.S. Appl. No. 12/029,065, filed Feb. 11, 2008.

* cited by examiner

*Primary Examiner*—Melvin C Mayes
*Assistant Examiner*—Yun Qian
(74) *Attorney, Agent, or Firm*—Oliff & Berridge, PLC

(57) ABSTRACT

An ink set includes a plurality of inks, at least one ink but less than all inks of the ink set including an ink vehicle, colorant and fluorescence agent and remaining additional inks including an ink vehicle, colorant and free of fluorescence agent. At least a first ink grouping and a second ink grouping of the ink set form a combination, the first and second groupings of the combination exhibiting a substantially same color under ambient light conditions upon image formation. The first ink grouping and the second ink grouping of the combination contain a different amount of the fluorescence agent, wherein upon exposure to activating energy, the fluorescence agent fluoresces to cause a visible change in the color of a pattern formed in an image by the first ink grouping as compared to the second ink grouping.

20 Claims, No Drawings

SOLID PHASE CHANGE FLUORESCENT INK AND INK SETS

BACKGROUND

Described herein is a set of solid phase change or hot melt ink sets comprising a plurality of inks, wherein at least one of the inks of the set comprises a fluorescence agent. The set includes a combination of ink groupings comprised of a first grouping and a second grouping that both exhibit a substantially same color under ambient light conditions and in which one of the ink groupings includes more fluorescence agent than the other ink grouping of the combination. Upon exposure to activating energy, the fluorescence agent fluoresces to cause a visible change between the appearance of the two ink groupings. A combination of particular pigment colorant and fluorescence agent enables the ink with the fluorescence agent to advantageously be a dark colored ink, such as a black ink.

A number of advantages are associated with the various embodiments described herein. For example, the inks with the fluorescence agent may be used to include security features in a printed document, including features to verify the authenticity of the document and/or to include digitally stored, machine readable or encrypted information in the document. Another advantage is represented by the possibility of printing customized security content on various forms and documents a process known as Variable Data Printing, which is enabled by digital printing of security features. This is advantageous because it makes counterfeiting very difficult because each printed document must be attempted to be copied individually. The security information may be hidden in the document until exposed to activating energy or radiation such as UV light that causes the fluorescence agent to illuminate or fluoresce. The security information can then be viewed to verify the authenticity, or can be machine read to decode digitally stored encrypted information. The security information cannot be copied with existing photocopiers. Other advantages include that the two ink groupings of a combination may be made to exhibit the substantially same color in ambient light conditions, such that the presence of hidden information cannot be detected until exposed to the activating energy to initiate fluorescence, whereby at least one of the two ink groupings of the combination changes color to render the hidden information viewable/readable. Other advantages are apparent from the description herein.

REFERENCES

U.S. Pat. Nos. 5,006,170 and 5,122,187, the disclosures of each of which are incorporated herein by reference in their entireties, disclose hot melt ink compositions suitable for ink jet printing that comprise a colorant, a an ink, and a propellant.

U.S. patent application Ser. No. 11/837,585, incorporated by reference herein in its entirety, describes a luminescent marking material that includes a luminescent material, which includes quantum dots, and a vehicle for delivering the luminescent material to an object. Also described is a method of embedding information on a substrate that includes assigning information to luminescent material, which includes quantum dots, forming luminescent marking material by combining luminescent material and marking material, and creating an image on a substrate with the luminescent marking material. A system that embeds and recovers information on a substrate includes an image forming device containing such a luminescent marking material for forming an image on the a substrate and a document reading device including a radiation emitting unit, which emits radiation that causes the luminescent marking material to illuminate, and a reader that detects the data on the substrate while the luminescent marking material is illuminated, is also described.

U.S. patent application Ser. No. 12/029,065, incorporated by reference herein in its entirety, describes a document that includes a paper substrate having an average surface roughness of at least about 0.5 microns, wherein the paper substrate includes encoded information printed thereon, and wherein the encoded information is printed with an ink comprised of light absorbing material that absorbs light only at wavelengths below 350 nm and an optional clear an ink in a solvent. The encoded information is substantially not detectable to a naked human eye through differential gloss or exposure to light having wavelengths of 365 nm or more, and is only revealed upon exposing the document to light having a wavelength at which the light absorbing material absorbs light, which is less than 350 nm.

U.S. Patent Application Publication No. 2008/0110995, incorporated by reference herein in its entirety, describes a method of embedding machine readable information on a substrate, including converting the information to machine readable code format and writing the machine readable code format on the substrate with at least one fluorescent marking material. Also disclosed is a system for embedding and recovering machine readable information on a substrate, including an image forming device containing at least one fluorescent marking material, wherein the image forming device receives data representative of the machine readable information, and forms an image corresponding to the data in a machine readable code format with the at least one fluorescent marking material on an image receiving substrate, and a document reading device including a radiation emitting unit that emits radiation effecting fluorescence of the at least one fluorescent marking material, and a reader that detects the data in the image on the mage receiving substrate while the at least one fluorescent marking material is fluorescing.

U.S. Patent Application Publication No. 2008/0087190, incorporated by reference herein in its entirety, describes a phase change ink containing a fluorescent colorant that upon exposure to activating energy fluoresces such that an image that was not visible prior to exposure to the activating energy becomes visible. Also disclosed are an ink jet system and a process for authenticating a color document using the disclosed phase change ink.

U.S. Patent Application Publication No. 2007/0262579, incorporated by reference herein in its entirety, describes a watermark embedded in an image that has the property of being relatively indecipherable under normal light, and yet decipherable under UV light. The fluorescent mark comprises a substrate containing optical brightening agents, and a first colorant mixture pattern printed as an image upon the substrate. The colorant mixture pattern layer has as characteristics a property of strongly suppressing substrate fluorescence, as well as a property of low contrast under normal illumination against the substrate or a second colorant mixture pattern printed in close spatial proximity to the first colorant mixture pattern. The second colorant mixture pattern having a property of providing a differing level of substrate fluorescence suppression from the first such that the resultant image rendered substrate suitably exposed to an ultra-violet light source will yield a discernable image evident as a fluorescent mark.

Fluorescent marks such as described in U.S. Patent Application Publication No. 2007/0262579 are an excellent security feature. As the four colors cyan, yellow, magenta and black are typically used to determine the color space, there are many color combinations in the color space for providing exactly the same color. Fluorescent marks can take advantage of this by using two different color combinations to provide exactly the same color, but which have very different UV behavior. This may be done by controlling the paper area coverage and creating a high fluorescent signal for combinations that expose the maximal amount of paper. This combination provides a uniform color to the viewer under visible light, but under black light, fluorescence from the paper provides a visible graphic or text image. The security image is able to contain variable data through the use of "patternink" constructs in standard Page Description Languages.

However, fluorescent marks depend on the fluorescence in the substrate for the effect, and as a result may be limited in applications. For example, fluorescent marks may be limited by the inherent spectral characteristics of the pigments, and are typically used only in light colors. Fluorescent marks also require the presence of fluorescence additives in the recording media substrate, and substrate independent inks are desired.

SUMMARY

Desirable would be an enhanced security solid phase change ink package that is capable of functioning as a standard solid phase change ink but that includes enhanced fluorescent attributes and can be useable in nearly all colors, including dark colors such as black.

Disclosed herein is an ink set comprised of a plurality of solid phase change inks. At least one, but not all, of the inks of the ink set is comprised of pigment colorant, an in vehicle and fluorescence agent, and remaining additional inks are comprised of pigment colorant and an ink vehicle, and free of fluorescence agent. At least a first ink grouping and a second ink grouping of the ink set form a combination that exhibits a substantially same color under ambient light conditions upon image formation. The first ink grouping and the second ink grouping contain a different amount of the fluorescence agent, wherein upon exposure to activating energy, the fluorescence agent fluoresces to cause a visible change in the color of a pattern formed in an image by the first ink grouping as compared to the second ink grouping.

Also disclosed is a solid phase change ink comprising a vehicle, a black pigment, and a lanthanide fluorescence agent.

Also disclosed is a method of forming an image, comprising, with an ink set as described herein, jetting the first ink grouping of the combination onto a recording media in a first pattern, jetting the second ink grouping of the combination onto the recording media in a second pattern, and solidifying the first ink grouping of the first pattern and the second ink grouping of the second pattern.

EMBODIMENTS

Described herein are inks, and in particular solid phase change inks, that contain a fluorescence agent that upon exposure to activating energy to which the fluorescence agent is sensitive results in a bright emissive image of a color different from a color exhibited under ambient light conditions by an image formed by the inks. Images formed from the inks and under ambient light conditions may exhibit a substantially same color and gloss as that of an image formed from a similar ink but not containing the fluorescence agent. The inks containing the fluorescence agent may thus be used to form an ink set that enables security features to be formed in an image derived from the set of inks.

Desirably, the ink set includes a number of inks, such as at least two inks, for example from two to ten inks, from two to five inks or from two to four inks, wherein a substantially same color is achievable by at least two different groupings of inks of the ink set. A combination refers to, for example, separate groupings of inks, with each grouping comprised of one or more inks of the ink set. In a full color system, typically at least four differently colored inks are used in the ink set, one for each of cyan (C), yellow (Y), magenta (M) and black (K). Multiple distinct ink combinations of the ink set may be used to achieve a same color In color printing, this is often referred to as metamerism, where different cyan, magenta, yellow and black inks are used to print a color image and various different CMYK combinations generally result in the same color to a human observer. For example, a first ink grouping of cyan, yellow and magenta inks in the correct ratio, for example each at 33.33%, can form the same black color as the black ink (which would comprise the second ink grouping). In this example, then, the ink combination achieving the same color would comprise the first grouping of cyan, yellow and magenta inks and the second grouping of black ink. Of course, if the ink set includes two inks of the same color, for example one black ink containing a fluorescence agent and one black ink free of fluorescence agent, then these two inks can each be used to achieve the same color. Thus, for a non-full color system, two inks are typically included, each of the same color, and the ink combination comprises a first grouping of the first black ink and a second grouping of the second black ink.

In the ink sets herein, at least one ink but less than all inks of the ink set is comprised of an ink vehicle, pigment and fluorescence agent, and optionally more than one ink of the ink set is also comprised of ink vehicle, pigment and fluorescence agent, with remaining additional inks of the ink set comprised of an ink vehicle, pigment and free of fluorescence agent. At least a first grouping of inks and a second grouping of inks of the ink set form a combination that exhibits a substantially same color under ambient light conditions upon image formation, but the first ink grouping and the second ink grouping containing a different amount of the first ink so as to contain differing amounts of the fluorescence agent. A combination for achieving a given or predetermined substantially same color must contain differing amounts of the fluorescence agent so as to be measurably or detectably different upon exposure to activating energy. This can be achieved by several formulations as described herein, for example by (1) an ink combination achieving a substantially same color wherein the first grouping includes fluorescence agent and the second grouping does not include fluorescence agent or (2) an ink combination achieving a substantially same color wherein both groupings contain fluorescence agent but the first grouping includes an amount of fluorescence agent different from the amount of fluorescence agent in the second grouping.

In a first embodiment, the ink combination achieving a substantially same color is one where the first grouping includes fluorescence agent and the second grouping does not include fluorescence agent. This may be accomplished in any suitable manner. For example, where a first ink includes fluorescence agent and all of the additional inks do not, the ink combination of substantially a same color may be such that a first grouping of the combination includes some amount of the first ink so that the first grouping contains some amount of fluorescence agent and a second grouping includes only the one or more additional inks not containing fluorescence agent so that the grouping is free of fluorescence agent.

One example of this embodiment comprises a full color ink set of CMYK, where the black ink is the only ink comprising the fluorescence agent. Any of the other color inks may also be selected to contain a fluorescence agent; this example illustrates black ink for demonstration. A first grouping would comprise the black ink. A second grouping would comprise a combination of C, M and Y inks that achieves a substantially same black color. The second grouping is free of the fluorescence agent.

The ink set thus may comprise inks wherein one of the colors contains the fluorescent material without having its identical color without fluorescent materials present. This is advantageous because it reduces the number of inks. For example, one could have a set of cyan, magenta and yellow regular inks, plus a fourth ink which is black and contains fluorescent materials. Hidden messages or codes as security information can be created in this specific example in black by forming an image with a mixture of cyan, magenta and yellow to provide a first black area. The hidden message may be printed with the fourth ink, black containing fluorescent materials. Under regular viewing conditions, the print appears as a black area altogether. Under UV light, the hidden message becomes visible because it fluoresces when exposed to the activating light. Alternatively, the background can be printed with fluorescent black ink and the message can be printed with a combination of cyan, magenta and yellow providing indistinguishable black.

The ink set may also comprise inks that when formed into an image, different groupings of inks create essentially identical colors when viewed under normal lighting conditions. In this case, one of the cyan, magenta or yellow ink color contains a fluorescent material. As explained, there is more than one way of creating identical colors on a substrate. Black for example can be created by overlapping cyan, magenta and yellow, by just printing black ink, or by mixing smaller proportions of cyan, magenta and yellow with black ink. If for example magenta ink contains a fluorescent agent, then the black print having the highest amount of magenta will be the most fluorescent when exposed to UV light. Black made by using the second way (black ink only) will show no fluorescence at all and finally a print made using the third way will have a level of florescence comprised in between the first two. This approach has the advantage that it will show fluorescence even when the print is made on a dull substrate that has a low amount of optical brighteners. On such a dull substrate, fluorescent marks will not be efficient.

Another example of this first embodiment comprises an ink set including more than one ink of a same color, one of the same color inks containing a fluorescence agent and the other same color ink not containing the fluorescence agent. For example, if the ink set includes two black inks, one with fluorescence agent and one without, a first grouping would comprise the black ink with fluorescence agent and the second grouping would comprise the black ink without the fluorescence agent.

In a second embodiment, the ink combination achieving a substantially same color is where one of the groupings includes an amount of fluorescence agent different from the amount of fluorescence agent in the other grouping. The difference should be measurably detectable upon fluorescence, such that the difference can be used to form the security feature in the image. Measurably detectable refers to the difference in fluorescence being detected to be different by any suitable machine reading or sensing device, for example as are known in the art, or human.

The ink set of two ink groupings of a combination that exhibit a substantially same color in an image under ambient light conditions may be used to form hidden images or information, such as characters, images or digital data, which are not noticeable to the naked human eye under ambient light conditions and in the absence of the activating energy. The hidden information can be revealed by exposing the image to the activating energy, thereby causing the portions of the image containing the differing amounts of the fluorescence agent to fluoresce in a detectably different manner. The advantages enabled by the inks and ink sets include an enhanced security modification that optionally permits digital information or data to be embedded in the security feature.

When the ink grouping containing the fluorescence agent in a different amount from the other ink grouping of a substantially same color, but with both groupings desirably having a substantially same gloss, both ink groupings can be used to form an image xerographically on recording media such as paper without a visible change in color to a human under normal illumination. Each of the substantially same color ink groupings can be printed in different patterns, but integrated together in the overall image. The ink grouping with the greater amount of fluorescence agent-containing ink can be used to form a pattern including hidden information. In this way, the image can be made to contain a variable emissive fluorescent feature, wherein under normal ambient light conditions, the two ink groupings making up the combination exhibit substantially the same color, but upon exposure to the activating energy for the fluorescence agent, the hidden information can be made to become visible, for example by the fluorescence agent causing the pattern to be emitted in a different color or in a more intense emission. The hidden information can thus be exposed to verify the authenticity of the image and/or document, or to reveal information embedded in the pattern as digitally stored data that may be read by a machine.

In embodiments, the ink set is a solid phase change ink set comprised of a plurality of solid phase change inks, the solid phase change inks at least including two ink groupings that make up a combination that exhibits a substantially same color, and desirably also a substantially same gloss, in an image viewed under ambient light conditions.

Differently colored inks exhibit a color in a formed image, that is, an absorption characteristic, different from each other. For example, if a first ink exhibits a yellow color, then a second differently colored ink will exhibit a different noticeably different (to a human observer) shade of yellow or a different color altogether, for example such as cyan or magenta. A substantially same color herein refers to, for example, the two ink groupings each forming an image that has overall absorption characteristic within the visible range of wavelengths of the electromagnetic spectrum under normal, ambient light conditions, the color difference being substantially indiscernible to the naked human eye. In this regard, substantially same color may be thought of in terms of a CIELAB color space, in which the three coordinates of CIELAB represent the lightness of the color ($L^*=0$ yields black and $L^*=100$ indicates diffuse white), its position between red/magenta and green ($a^*$, negative values indicate green while positive values indicate magenta) and its position between yellow and blue ($b^*$, negative values indicate blue and positive values indicate yellow). A substantially same color may be two points on the color space wherein the values for $L^*$, $a^*$ and $b^*$ for each point are each sufficiently close, for example differing by less than a predetermined $\Delta E$ number, where in an ideal situation values below $1\Delta E$ are considered identical to a human. However, in real world applications, this idealized value is commonly not achieved and a difference of $5\Delta E$ is often sufficient, and in some cases even higher $\Delta E$ can be tolerate if sufficient visual distraction is encountered by the observer. Reference herein to the inks exhibiting a substantially same color refers to the color exhibited by the inks in an image formed using the inks.

Standard C, Y and M color inks absorb strongly in their respective frequency bands, but have a low absorbance outside that range. Black ink, however, is has a fairly constant absorbance across the visible, the UV and the IR parts of the spectrum.

At least one color of the ink set is achievable by two different groupings of inks of the set that exhibit the substantially same color. The substantially same color may be predetermined. While in embodiments the color represented by the two ink groupings is black, the two ink groupings having substantially the same color may be any color, including cyan, yellow, magenta and the like. More than one color may be selected as the substantially same color and achievable by different combinations of ink groupings of the set. In embodiments, the color represented by two ink groupings include darkly colored inks such as black, dark blue, dark gray and the like.

Each of the phase change inks of the ink set, including two inks exhibiting substantially the same color, may be made to also exhibit substantially the same gloss upon printing. As such, differential gloss realized such as when overcoating a formed image with a conventional clear overcoat or ink may be avoided. Gloss is a measure of an image's shininess, which should be measured after the image has been formed on a print sheet. Gloss may be measured using a Gardiner Gloss metering unit. In embodiments herein, each of the inks used in the ink set, including the two inks, are made to have substantially matched gloss. In this regard, each of the inks should exhibit an image gloss within about 5 Gardiner gloss units (ggu) of each other, for example a gloss value within from 0 to about 5 ggus or from about 0.5 to about 3 ggus or from about 0.5 to about 2 ggus, of each other. In doing so, the formed image having fluorescent capabilities exhibits substantially no differential gloss, and thus the appearance of the image is uniform.

In embodiments, the ink vehicle of a first ink containing fluorescence agent is the same as the ink vehicle of the additional inks of the ink set that are free of fluorescence agent. In embodiments where two inks have the same color, the first ink pigment is desirably the same as the same as the second ink pigment.

A first ink grouping of the two ink groupings may contain a fluorescence agent and the second ink grouping be substantially free of a fluorescence agent, in which case the first ink grouping color will change upon exposure to activating energy, or the first ink grouping may include a fluorescence agent that is different in amount or type from the fluorescence agent in a second ink grouping such that upon exposure to the activating energy for the fluorescence agent, the first ink grouping and the second ink grouping exhibit a visibly different color or emission from each other.

For all of the inks of the ink set, examples of phase change inks for use herein are inks that include an ink vehicle that is solid at temperatures of about 23° C. to about 27° C., for example room temperature, and specifically are solid at temperatures below about 40° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 180° C.

In this regard, all of the inks suitable for use herein may be either low energy inks or high energy inks. Low energy inks are solid at a temperature below about 40° C. and have a viscosity of from about 5 to about 15 centipoise at a jetting temperature of from about 80° C. to about 150° C., for example from about 90° C. to about 130° C. or from about 110° C. to about 120° C. High energy inks are solid at a temperature below 40° C. and have a viscosity of from about 5 to about 15 centipoise at a jetting temperature of from about 100° C. to about 180° C., for example from 120° C. to about 160° C. or from about 125° C. to about 150° C.

The ink vehicles for the phase change inks may have melting points of from about 60° C. to about 150° C., for example from about 80° C. to about 120° C. or from about 85° C. to about 110° C., as determined by, for example, observation and measurement on a microscope hot stage, wherein the an ink material is heated on a glass slide and observed by microscope. Higher melting points are also acceptable, although printhead life may be reduced at temperatures higher than 150° C.

In addition, the surface tension of the vehicle at the operating (jetting) temperature of the ink should be from about 20 to about 65 dynes per centimeter, for example from about 40 to about 65 dynes per centimeter, to enhance refill rates, paper wetting, and color mixing.

Any suitable ink vehicle can be employed in any of the phase change inks disclosed herein. Suitable vehicles can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below. The ink vehicle may also be radiation curable, for example any of the ink vehicles described in U.S. Patent Application Publication No. 2008/0090928, incorporated herein by reference in its entirety. The ink vehicle may also be any toner polymer an ink, for example such as a polyester or a polyacrylate and the like.

As used herein, the term wax includes, for example, natural, modified natural, synthetic waxes and compounded waxes.

Natural waxes may be of vegetable, animal, or mineral origin. Modified waxes are natural waxes that have been treated chemically to change their nature and properties. Synthetic waxes are made by the reaction or polymerization of chemicals. Compounded waxes are mixtures of various waxes or of waxes with resins or other compounds added thereto.

Examples of suitable waxes include polypropylenes and polyethylenes commercially available from Allied Chemical and PETROLITE Corporation, wax emulsions available from Michaelman Inc. and the Daniels Products Company, EPOLENE N-15 commercially available from Eastman Chemical Products, Inc., VISCOL 550-P, a low weight average molecular weight polypropylene available from Sanyo Kasei K.K., and similar materials. The commercially available polyethylenes selected usually possess a molecular weight of from about 1,000 to about 1,500, while the commercially available polypropylenes utilized for the ink compositions herein are believed to have a molecular weight of from about 4,000 to about 5,000. Examples of suitable functionalized waxes include, for example, amines, amides, imides, esters, quaternary amines, carboxylic acids or acrylic polymer emulsion, for example JONCRYL waxes such as 74, 89, 130, 537, and 538, all available from SC Johnson Wax, chlorinated polypropylenes and polyethylenes commercially available from Allied Chemical and PETROLITE Corporation and SC Johnson wax.

The wax in embodiments is a distilled polyethylene wax such as described in U.S. Pat. No. 7,381,254, incorporated herein by reference in its entirety, for example a polyethylene wax having an average peak molecular weight of from about 350 to about 730 and a polydispersity of from about 1.0001 to about 1.500.

Suitable phase change waxes include hydroxyl-terminated polyethylene waxes such as mixtures of carbon chains with the structure $CH_3-(CH_2)_n-CH_2OH$, where there is a mixture of chain lengths, n, where the average chain length is in the range of about 16 to about 50, and linear low molecular weight polyethylene, of similar average chain length. Suitable examples of such waxes include, for example, UNILIN® 350, UNILIN® 425, UNILIN® 550 and UNILIN® 700 with number average molecular weights approximately equal to 375, 460, 550 and 700 g/mol, respectively. All of these waxes are commercially available from Baker-PETROLITE (Sand Springs, Okla.).

Other suitable phase change waxes include alcohol waxes, for example, hydrogenated castor oil, 1-octadecanol, 1,10-decanediol and 1,12-dodecanediol. Other examples of mono functional alcohols that can be employed as phase change waxes herein include 1-tetradecanol, 1-pentadecanol, 1-hexadecanol, 1-heptadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol. Also suitable are Guerbet alcohols such as 2-tetradecyl 1-octadecanol, 2-hexadecyl 1-eicosanol, 2-octadecyl 1-docosanol, 2-nonadecyl 1-tricosanol, 2-eicosyl tetracosanol, and mixtures thereof. Suitable diols include 1,8-octanediol, 1,9-nonanediol, 1,13-tridecanediol, 1,14-tetradecanediol, 1,15-pentadecanediol, 1,16-hexandecanediol, 1,17-heptadecanediol, 1,18-octadecanediol, 1,19-nonadecanediol, 1,20-eicosanediol, 1,22-docosanediol, 1,25-pentacosanediol, and mixtures thereof.

In embodiments, the solid (or a phase change) ink includes a urethane wax, an alcohol wax, an olefin wax, or a combination thereof.

Other suitable phase change waxes include carboxylic acid waxes, for example, UNACID® 350, UNACID® 425, UNACID® 550, UNACID® 700, with number average molecular weights approximately equal to 390, 475, 565 and 720 g/mol, respectively. All of these waxes are commercially available from Baker-PETROLITE (Sand Springs, Okla.).

The ability of the wax to crystallize contributes to its overall hardness, which imparts strength to the ink. The degree of crystallization can be controlled by regulating the degree of branching (that is, irregularity) of the wax. A high degree of linearity of the wax chain, such as a polyethylene chain, generally yields a highly crystalline and hard material.

In embodiments, the wax is functionalized with one or more curable moieties, including, for example, vinyl ethers; epoxides, such as cycloaliphatic epoxides, aliphatic epoxides, and glycidyl epoxides; oxetanes; (meth)acrylates, that is, acrylates and methacrylates; and the like.

Additional examples of suitable ink vehicles include, for example, ethylene/propylene copolymers, such as those available from PETROLITE and of the general formula

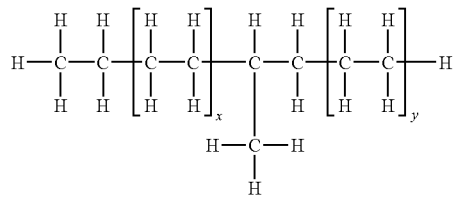

wherein y represents an integer from 0 to about 30, for example from 0 to about 20 or from 0 to about 10 and x is equal to about 21-y. The copolymers may have, for example, a meting point of from about 70° C. to about 150° C., such as from about 80° C. to about 130° C. or from about 90° C. to about 120° C. and a molecular weight range of from about 500 to about 4,000. Commercial examples of such copolymers include, for example, PETROLITE CP-7 (Mn=650), PETROLITE CP-11 (Mn=1,100, PETROLITE CP-12 (Mn=1,200) and the like.

Urethane derivatives of oxidized synthetic or petroleum waxes, such as those available from PETROLITE and of the general formulas

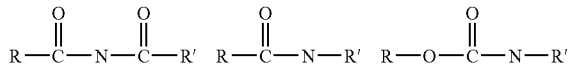

wherein R is an alkyl group of the formula $CH_3(CH_2)_n$, n is an integer of from about 5 to about 400, for example from about 10 to about 300 or from about 20 to about 200 and R' is a tolyl group, may also be used as the ink vehicle. These materials may have a melting point of from about 60° C. to about 120° C., such as from about 70° C. to about 100° C. or from about 70° C. to about 90° C. Commercial examples of such materials include, for example, PETROLITE CA-11 (Mn=790, Mw/Mn=2.2), PETROLITE WB-5 Mn=650, Mw/Mn=1.7), PETROLITE WB-17 (Mn=730, Mw/Mn=1.8), and the like.

Another type of ink vehicle may be n-paraffinic, branched paraffinic, and/or naphthenic hydrocarbons, typically with from about 5 to about 100, such as from about 20 to about 180 or from about 30 to about 60 carbon atoms, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from PETROLITE.

Highly branched hydrocarbons, typically prepared by olefin polymerization, such as the VYBAR materials available from PETROLITE, including VYBAR 253 (Mn=520), VYBAR 5013 (Mn=420), and the like, may also be used. In addition, the ink vehicle may be an ethoxylated alcohol, such as available from PETROLITE and of the general formula

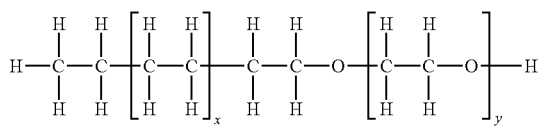

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

As an additional example, the ink vehicle may be made of fatty amides, such as monoamides, triamides, tetra-amides, mixtures thereof, and the like, for example such as described in U.S. Pat. No. 6,858,070, U.S. Pat. No. 6,174,937, and U.S. Pat. No. 6,860,930, incorporated herein by reference. Suitable monoamides may have a melting point of at least about 50° C., for example from about 50° C. to about 150° C., although the melting point can be below this temperature. Specific examples of suitable monoamides include, for example, primary monoamides and secondary monoamides. Stearamide, such as KEMAMIDE S available from Witco Chemical Company and CRODAMIDE S available from Croda, behenamide/arachidamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of suitable secondary amides. Additional suitable amide materials include KEMAMIDE W40 (N,N'-ethylenebisstearamide), KEMAMIDE P181 (oleyl palmitamide), KEMAMIDE W45 (N,N'-ethylenebisstearamide), and KEMAMIDE W20 (N,N'-ethylenebisoleamide).

High molecular weight linear alcohols, such as those available from PETROLITE and of the general formula

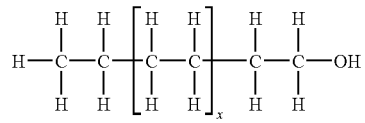

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN materials such as UNILIN 425 (Mn=460), UNILIN 550 (Mn=550), UNILIN 700 (Mn=700), and the like.

A still further example includes hydrocarbon-based waxes, such as the homopolymers of polyethylene available from PETROLITE and of the general formula

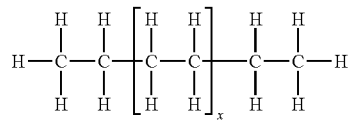

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include the line of waxes, such as POLYWAX 500 (Mn=500), POLYWAX 655 (Mn=655), POLYWAX 850 (Mn=850), POLYWAX 1000 (Mn=1,000), and the like.

Another example includes modified maleic anhydride hydrocarbon adducts of polyolefins prepared by graft copolymerization, such as those available from PETROLITE and of the general formulas

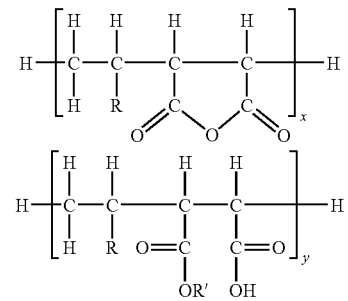

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; those available from PETROLITE and of the general formula

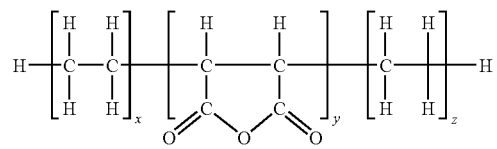

wherein R is an alkyl group with from about 1 to about 50, such as from about 5 to about 35 or from about 6 to about 28 carbon atoms, x is an integer of from about 1 to about 50, such as from about 5 to about 25 or from about 9 to about 13, y is 1 or 2, and z is an integer of from about 1 to about 50, such as from about 5 to about 25 or from about 9 to about 13; and those available from PETROLITE and of the general formula

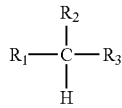

wherein $R_1$ and $R_3$ are hydrocarbon groups and $R_2$ is either of one of the general formulas

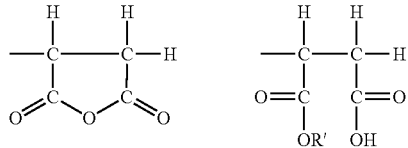

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER 67 (Mn=655, Mw/Mn=1.1), CERAMER 1608 (Mn=700, Mw/Mn=1.7), and the like.

Additional examples of suitable ink vehicles for the phase change inks include rosin esters; polyamides; dimer acid amides; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; sulfones, such as diphenyl sulfone, n-decyl sulfone, n-arnyl sulfone, chlorophenyl methyl sulfone; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, monton wax, candelilla wax, GLSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In addition, the ink vehicles described in U.S. Pat. No. 6,906,118, incorporated herein by reference, may also be used. Also suitable as ink vehicles are liquid crystalline materials as disclosed in, for example, U.S. Pat. No. 5,122,187, the disclosure of which is totally incorporated herein by reference.

Also suitable are urethane resins, including those prepared as disclosed in U.S. Pat. No. 5,782,966 and U.S. Pat. No. 6,309,453, the disclosures of each of which are totally incorporated herein by reference.

The ink vehicle may comprise one or more of the aforementioned suitable materials.

The ink vehicle may comprise from about 5% to about 95% by weight of the ink, for example from about 10% to about 85% or from about 20% to about 75% by weight of the ink.

Phase change inks of the ink set also contain at least one colorant, desirably a non-fluorescent colorant. As used herein "colorant" includes pigment, dye, mixtures of dyes, mixtures of pigments, mixtures of dyes and pigments, and the like. The colorant of the inks of the ink set including a fluorescence agent must be a pigment. This is because when pigments are used for providing color, and the fluorescence agent is dispersed in the ink vehicle, there is always sufficient room between the pigment particles to permit light to reach the fluorescence agent. This may not always be the case when using a dye as the colorant, which are dispersed the same as the fluorescence agent in the ink vehicle and thus may not allow sufficient light to reach the fluorescence agent, particularly for a darkly colored ink such as a black ink. Fluorescence may thus not be properly realized.

While the colorant of inks of the ink set not containing a fluorescence agent may use a non-pigment colorant, it is desired that all inks of the ink set include a pigment colorant so that regardless of the order in which the inks are printed onto the recording media, light will be able to reach the fluorescence agent so that the desired fluorescence can be realized.

The colorant may be present an ink in any desired amount, typically from about 0.5 to about 75 percent by weight of the ink vehicle, for example from about 1 to about 50 percent by weight of the ink vehicle.

Any pigment may be chosen, provided that it is capable of being dispersed or dissolved in the ink vehicle and is compatible with the other ink components. Examples of suitable pigments include, for example, Violet PALIOGEN Violet 5100 (BASE); PALIOGEN Violet 5890 (BASF); HELIOGEN Green L8730 (BASF); LITHOL Scarlet D3700 (BASF); SUNEAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RE (Ciba); PALIOGEN Red 3871 K (3ASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNEAST® Magenta 122 (Sun Chemical 228-0013); HELIOGEN Blue D6840, D7080 (BASE); Sudan Blue OS (BASF); NEOPEN Blue FF4012 (3ASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALTOGEN Orange 3040 (BASF); PALIOGEN Yellow 152, 1560 (BASF); LITHOL Fast Yellow 0991 K (BASF); PALIOTOL Yellow 1840 (BASF); NOVOP- ERM Yellow FGL (Clariant); Lumogen Yellow D0790 (BASF); Suco-Yellow L1250 (BASF); Suco-Yellow D1 355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASE); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like.

In the inks of the ink set including a fluorescence agent, the fluorescence agent is a material that responds to activating energy, such as ultraviolet or black light, to emit or fluoresce at a different color than the material exhibits at ambient light. The activating energy or radiation may be, for example a radiation source having a wavelength from about 100 nm to about 1100 nm, such as from about 150 nm to about 900 nm or from about 200 nm to about 600 nm. The activating energy may thus be in the ultraviolet (UV), visible or infrared regions, although the use of activating radiation in the UV region (from about 100 nm to about 400 nm) is most common. The fluorescence may occur instantaneously on exposure to the activating energy, or may occur after overcoming any activation phase. The fluorescence exhibited may be reversible, but should last for a time period permitting the color change or image appearance change to be detected, for example a time frame of from about 0.5 seconds to about 1 hour, such as from about 1 second to about 45 minutes or from about 5 seconds to about 30 minutes.

A total amount of the fluorescence agent in an ink grouping may comprise from about 0.1% to about 75% by weight of the total weight of the grouping. When both groupings contain an amount of the fluorescence agent, the amount of the agent in the two groupings, in order to be detectably different, may differ by at least about 3 percentage units, such as at least about 5 or 10 percentage units. Thus, if a first grouping includes 50% fluorescence agent, the second grouping may contain 47% fluorescence agent or less, or 53% fluorescence agent or more.

Suitable fluorescence agents include, for example, fluorescent dyes, fluorescent pigments and inorganic surface functionalized quantum dot materials. Examples of fluorescent dyes suitable for use herein include those belonging to the dye families known as rhodamines, fluoresciens, coumarins, napthalimides, benzoxanthenes, acridines, azos, mixtures thereof and the like. Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160, Fluorescent Brightener 61, mixtures thereof and the like. Suitable fluorescent pigments include, but are not limited to, those available from Day-Glo Color Corp., such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17N, mixtures thereof and the like. Other suitable fluorescent pigments available from Risk Reactor are for example PFC class, like for example PFC-03 which switches from invisible to red when exposed to UV light, PF class like for example PF-09 which switches from invisible to violet when exposed to UV light. Other suppliers of fluorescent materials include Beaver Luuminescers from Newton, Mass. and Cleveland Pigment & Color Co. form Akron, Ohio Quantum dot materials are fluorescent inorganic semiconductor nanoparticle materials. The light emission of quantum dots is due to quantum confinement of electrons and holes. An advantage of quantum dots is that they can be tuned so that they emit any desired wavelength (color) as a function of their size, by using one material only and the same synthetic process. For example in a range comprised from about 2 to about 10 nm, one can obtain a full range of colors from the visible range of the spectrum. In addition, quantum dots possess improved fatigue resistance when compared with organic dyes. Another advantage of quantum dots is their narrow emission bands, which increases the number of possible wavelength choices for designing customized colors. Due to their small size, typically less than about 30 nm, such as less than about 20 nm, they can be easily ink jetted. Quantum dots are available from a variety of companies, such as from Evident Technologies (Troy, N.Y.).

In embodiments, the quantum dot materials used herein are functionalized quantum dots. Surface functionalized quantum dots may have better compatibility with phase change ink materials set. Suitable functional groups present on the surface of the nanoparticle quantum dots for compatibility with phase change ink include long linear or branched alkyl groups, for example from about 1 carbon atom to about 150 carbon atoms in length, such as from about 2 carbon atoms to about 125 carbon atoms or from about 3 carbon atoms to about 100 carbon atoms. Other suitable compatibilizing groups include polyesters, polyethers, polyamides, polycarbonates and the like.

In embodiments, the fluorescence agent is a lanthanide material or complex, such as a lanthanide chelate. Examples of lanthanide chelates include those formed by the chelation of organic ligands such as acetylacetone, benzoylacetone, dibenzoylmethane, and salicylic acid with lanthanide ions such as neodymium, europium, samarium, dysprosium, terbium ions and the like. Examples of such complexes include europium acetylacetonate, samarium acetylacetonate, neodymium benzoylacetonate, terbium salicylate, and dysprosium benzoylacetonate. The above chelates absorb ultraviolet radiation and fluoresce in the visible range. For darkly colored inks, a desirable fluorescence agent is DFKY-C7, a red emitting fluorescent dye from Risk Reactor.

Other suitable fluorescent dyes include oil and solvent based dyes like DFSB class, DFWB class, DFPD class, DFSB-K class and the like available from Risk Reactor, such as DFWB-K41-80 that is red in ambient light and that fluoresces red-purple under UV light, DFSB-K401 that is red-purple in ambient light and that fluoresces red-purple under WV light, DFSB-K400 that has a brown appearance in ambient light and that fluoresces orange under excitation with UV light, DFSB-K427 that is orange under ambient light and under exposure to UV light, and DFSB-K43 that is yellow in ambient light and under exposure to activating UV light.

The fluorescence agent may be present in the ink in any suitable amount, such as from about 0.1% to about 75%, for example from about 0.5% to about 25% or about 0.5% to about 10% by weight of the ink.

In embodiments, the solid phase change ink containing a fluorescence agent is an ink comprising an ink vehicle such as described above, a black pigment, and a lanthanide fluorescence agent. The black pigment may be a carbon black. Such an ink may be used in combination with a regular standard or process black ink of a substantially same color.

The ink of embodiments may further include conventional additives to take advantage of the known functionality associated with such conventional additives. Such additives may include, for example, biocides, defoamers, slip and leveling agents, tackifiers, plasticizers, pigment dispersants, viscosity modifiers, antioxidants, UV absorbers, and the like.

The phase change ink compositions may be prepared by combining all of the ingredients, heating the mixture to at least its melting point, for example from about 70° C. to about 150° C., and stirring the mixture, for example from about 5 seconds to about 60 minutes or more, to obtain a substantially homogeneous, uniform melt. When pigments are the selected colorants, the molten mixture may be subjected to grinding in an attritor or ball mill apparatus to effect dispersion of the pigment in the ink vehicle.

The inks of the ink set may be applied to recording media, such as paper, plastic, cardboard, metal and the like, using any suitable printing technique. Typically, an ink jet device is used.

Ink jetting devices are known in the art. As described in U.S. Pat. No. 6,547,380, the disclosure of which is incorporated herein by reference in its entirety, ink jet printing systems are generally of two types: continuous stream and drop-on-demand In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are generally three types of drop-on-demand ink jet systems, a piezoelectric device, an acoustic ink device and thermal ink jet, or bubble jet, device. In ink jet processes employing solid phase change inks, the solid ink is melted by the heater in the printing apparatus and utilized (that is, jetted) as a liquid. Upon contact with the printing substrate, the molten ink solidifies rapidly.

The image may be applied by jetting the colored inks during four to eighteen rotations (incremental movements) of a substrate such as an image receiving member with respect to the ink jetting head, that is, there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, they quickly solidify to form a predetermined pattern of solidified ink drops.

A first ink grouping of a combination may be applied to the recording media substrate before, during or after patterns, or images, are printed with the other ink grouping of the combination. In embodiments where the combination includes two inks of a same color, the ink with the fluorescence agent may be printed after the printing of the substantially same color ink without a fluorescence agent. In this way, when the ink with the fluorescence agent is made to have a pattern over at least some portions of the pattern formed by the ink without the fluorescence agent, the full desired effect of the fluorescence can be realized upon exposure to activating radiation without concern of any masking from the ink without fluorescence agent.

The fluorescence property of the fluorescence agent may be especially useful in security applications. In embodiments, the presence of the fluorescence agent is not noticeable to a viewer when viewed in ambient light, but becomes noticeable when exposed to radiation at which the fluorescence agent fluoresces. Upon the printed image/document being removed from exposure to the activating radiation, the fluorescence agent once again returns to a non-fluorescing state. Such a feature may be useful, for example, in authentication of documents, as a forged document or photocopy would not have the ability to fluoresce and change appearance upon exposure to the activating radiation. The change between the fluorescing state and the non-fluorescing state can be repeated an indefinite number of times, and for example from about 10 to about 100,000,000 times or more.

Also, this feature can permit one to intentionally embed hidden information in documents, which information is only revealed to one knowing to expose the document to activating energy. The hidden information may take the form of characters, text, images and the like, which forms, or patterns, are provided by the printing of the ink containing the fluorescence agent. This information can indicate and/or verify the authenticity of the image and/or document formed using the ink sets described herein.

In embodiments, the pattern formed by the ink containing the fluorescence agent may be machine readable code storing digital data or information in the document. The machine readable code format may be, for example, one dimensional barcode, two dimensional barcode, glyphs, dots, combinations thereof and the like. One dimensional barcodes have a form such as used for UPC codes on products. The two dimensional barcode may be of any suitable type, such as, for example, PDF417 (based on stacked barcodes), 3-DI, Array Tag, Aztec code, Codablock, Code 16K, CP code, Data Matrix, Datastrip code, Maxicode, Minicode, and the like. The encoded information may also be in the form of data glyphs or dots. In glyphs code, the code format is a self-clocking glyph code as disclosed in, for example, U.S. Pat. Nos. 5,128,525 and 5,168,147, the disclosures of each of which are totally incorporated herein by reference. This code comprises printed glyphs which represent 0 and 1 bits in a document encoding scheme. such as / and \. Each symbol may represent one bit; for example, /=1 and \=0. In dot code, 0s and 1s are represented by the presence or absence of a dot. Dots refer to, for example, any mark of any shape, and includes, for example, circular or rectangular marks.

For embedding digital data or information in the image formed with the ink sets herein, the printer has an associated encoding device, which receives the information to be encoded and encodes the information in a suitable machine readable format. The encoded information is sent to the printer for printing onto the paper substrate using an ink containing a fluorescence agent. The device may also include a detector/reader for detecting and reading the hidden information when it is exposed by activation of the fluorescence agent. For this detection, the image is exposed to the activating energy to cause the fluorescence agent to emit light at a different color and, while still exhibiting the different color, detecting and reading the information with a detector/reader. The system may also include one or more processors, for example to convert information to the encoded information representative of the information, that is, to convert the information to a machine readable code format. A similar processor may be used to decode encoded information detected by a reader, that is, convert the encoded information to its original uncoded information form, to recover the encoded information. The decoded information may be presented to a person in human-understandable format, which can confirm the authenticity of the image and/or document as well as inform of the hidden information contained in the document. One example use of this feature may be to encode the actual amount of a check, permitting detection of checks in which the actual amount may have been altered.

As mentioned above, the ink set may include a number of colors, and the inks may be used to form other visible images on the document. The visible and hidden information images may share a same portion of the document, or the hidden information portion may be in a separate portion of the document for easy location by a person or detector/reader. Because the hidden information is a same color as one of the inks of the ink set, the presence of the hidden information in the image is not detectable by the naked human eye.

As the recording media, any suitable substrate material capable of being printed may be used, such as paper, plastic, cardboard, metal and the like. In embodiments, the recording media is paper. The paper may include optical brightening agents such as described in U.S. Patent Application Publication No. 2007/0262579, such that the image formed on the substrate may include the synergistic effect of the fluorescence from the fluorescence agent and the radiated fluorescence as a result of the optical brightening agent. Fluorescence marks formed on paper substrates having optical brighteners may be particularly advantageous as a result.

Embodiments described above will now be further illustrated by way of the following examples.

Example 1

A black ink was prepared by melting and mixing about 2% of a fluorescent dye (DFKY-CY from Risk Reactor) into a black solid ink composition. The black solid ink composition contained 2.8% carbon black pigment into a solid ink base similar to the one currently available on Xerox Phaser 8860.

A similar black ink was prepared, except omitting the fluorescent dye, the ink having the same effective percentage of carbon black as the above ink.

Text was handwritten on a paper substrate using both the ink with the fluorescent dye and the ink without the fluorescent dye. Under ambient light conditions, both writings exhibit the substantially same black color with no discernible difference. However, upon exposure to black light (UV light), the color of the text written with the ink containing a fluorescence agent changed from black to red.

Example 2

In this example, the above inks are again used. A large black color rectangle is first printed with the ink not containing the fluorescent dye. The text "security message" is then printed upon the black rectangle with the ink containing the fluorescent dye. Under ambient light, all that is visible is a black rectangle. Upon exposure to black light, the words "security message" appear in red within the black triangle where printed with the ink containing the fluorescent dye.

Comparative Example 1

A black ink was prepared by mixing a 2% amount of fluorescent dye (DEKY-CY from Risk Reactor) into a conventional black solid ink composition, containing black dye, ink which is commercially available and used with Xerox commercially available solid ink Phaser printers.

Upon printing onto a substrate and exposure to black light, no color change or fluorescence was observed. This is believed to be because the black dye, unlike the black pigment, obscures the activating energy from reaching the fluorescence agent, thereby suppressing the fluorescence.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An ink set comprised of a plurality of solid phase change inks, at least one ink but less than all inks of the ink set comprising an ink vehicle, pigment and fluorescence agent and remaining additional inks comprised of an ink vehicle, pigment and free of fluorescence agent, wherein at least a first ink grouping comprised of at least one of the plurality of solid phase change inks of the ink set and a second ink grouping comprised of at least one other of the plurality of solid phase change inks of the ink set each are capable of exhibiting a substantially same color under ambient light conditions upon image formation, in which the substantially same color exhibited by the first and second ink groupings differs by no more than $5\Delta E$ on a CIELAB color scale under ambient light, the first ink grouping and the second ink grouping each containing a different amount of the fluorescence agent, wherein upon exposure to activating energy, the fluorescence agent fluoresces to cause a visible change in the color of a pattern formed in an image by the first ink grouping as compared to the second ink grouping.

2. The ink set according to claim 1, wherein the first ink grouping contains an amount of the fluorescence agent in inks of the grouping and the second ink grouping is free of any fluorescence agent.

3. The ink set according to claim 1, wherein the first ink grouping comprises cyan, yellow and magenta inks free of the fluorescence agent and the second ink groupings comprises black ink containing the fluorescence agent.

4. The ink set according to claim 1, wherein both the first ink grouping and the second ink grouping include an amount of the fluorescence agent, and wherein the amount of the fluorescence agent in the first ink grouping is greater than the amount of fluorescence agent in the second ink grouping.

5. The ink set according to claim 1, wherein the first ink grouping comprises one ink of a predetermined color and the second ink grouping comprises one ink of substantially the same predetermined color.

6. The ink set according to claim 5, wherein the ink set is a full color ink set comprising additional inks of colors different from the first and second ink groupings having substantially the same predetermined color.

7. The ink set according to claim 5, wherein the predetermined color is black.

8. The ink set according to claim 5, wherein the first ink comprises one ink of a predetermined color and the second ink grouping comprises one ink of the same predetermined color, wherein the substantially same color exhibited by the first and second ink groupings differ by no more than $1\Delta E$ on the CIELAB color scale under ambient light.

9. The ink set according to claim 1, wherein the inks of the ink set all comprise the same ink vehicle.

10. The ink set according to claim 1, wherein the ink vehicle of each ink of the ink set is a solid at a temperature below about 40° C. and has a viscosity of from about 1 to about 20 centipoise at a jetting temperature of from about 60° C. to about 150° C.

11. The ink set according to claim 1, wherein the vehicle of each ink of the ink set is selected from the group consisting of paraffins, microcrystalline waxes, polyethylene waxes, ester waxes, fatty acids, fatty amide containing materials, sulfonamide materials, ethoxylated alcohols, linear alcohols, and combinations thereof.

12. The ink set according to claim 1, wherein the fluorescence agent comprises a lanthanide.

13. The ink set according to claim 1, wherein the substantially same color exhibited by the first and second ink groupings differ by no more than 1ΔE on a CIELAB color scale under ambient light.

14. A method of forming an image, comprising:
with an ink set comprised of a plurality of inks, at least one ink but less than all inks of the ink set comprising an ink vehicle, colorant and fluorescence agent and remaining additional inks comprised of an ink vehicle, colorant and free of fluorescence agent, wherein at least a first ink grouping comprised of at least one of the plurality of solid phase change inks of the ink set and a second ink grouping comprised of at least one other of the plurality of solid phase change inks of the ink set are each capable of exhibiting a substantially same color under ambient light conditions upon image formation in which the substantially same color exhibited by the first and second ink groupings differ by no more than 5ΔE on a CIELAB color scale under ambient light, the first ink grouping and the second ink grouping each containing a different amount of the fluorescence agent, wherein upon exposure to activating energy, the fluorescence agent fluoresces to cause a visible change in the color of a pattern formed in an image by the first ink grouping as compared to the second ink grouping,
jetting the first ink grouping onto a recording media in a first pattern;
jetting the second ink grouping onto the recording media in a second pattern; and
solidifying the first ink grouping in the first pattern and the second ink grouping in the second pattern.

15. The method according to claim 14, wherein the second ink grouping is comprised of a greater amount of fluorescent material than the first ink grouping and is jetted after the first ink grouping.

16. The method according to claim 14, wherein at least portions of the second pattern are formed over portions of the first pattern.

17. The method according to claim 14, further comprising exposing the image to the activating energy to initiate fluorescence of the fluorescence agent in the first and/or second pattern.

18. The method according to claim 17, wherein upon fluorescence, the second pattern exhibits a color different from the color exhibited in an image formed by the two ink groupings under ambient light conditions.

19. The method according to claim 14, wherein the first pattern or the second pattern includes the fluorescence agent and is comprised of digital information.

20. The method according to claim 19, wherein the digital information is machine readable, and the method further comprises exposing the image to the activating energy to initiate fluorescence of the fluorescence agent in the first or the second pattern and reading the digital information with a machine during the fluorescence.

* * * * *